Dec. 15, 1970     B. C. EPPLER     3,547,578

BARBER TOOL STERILIZER

Filed May 10, 1968

INVENTOR.
BYRON C. EPPLER

BY

ATTORNEY

United States Patent Office 3,547,578
Patented Dec. 15, 1970

3,547,578
BARBER TOOL STERILIZER
Byron C. Eppler, 1318 S. Cherry,
Ada, Okla. 74820
Filed May 10, 1968, Ser. No. 728,276
Int. Cl. A61l 7/00
U.S. Cl. 21—87         3 Claims

ABSTRACT OF THE DISCLOSURE

A container for sterilizing barber implements, provided with a pivoted tray lift and tilt-actuated sterilizing lamp means in the container lid.

This invention relates to a container for barber implements, wherein the implements are received on a pivot-actuated tray. In a preferred embodiment, the container is provided with a cover containing a tilt-actuated sterilizing lamp.

It is an object of this invention to provide a container for barber implements wherein the container can be opened and closed, implements can be inserted and removed, and implements can be immersed into and removed from a sterilizing solution, all by a one-handed operation. It is a further object of the invention to provide such a container wherein the implements are sterilized, warmed, and dried.

Further objects and the several advantages of the invention will become apparent from the following description and claims, and from the accompanying drawing, wherein:

Figure 1:
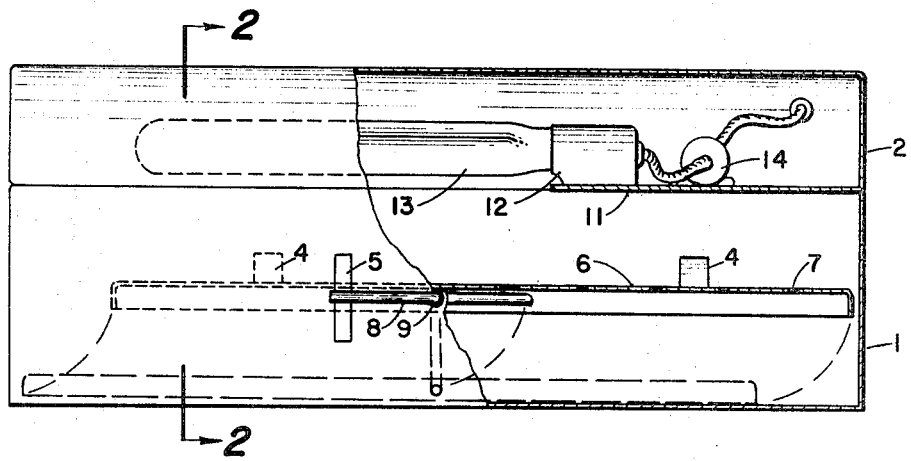
FIG. 1 is an elevation, partially cut away, of the front of a container according to my invention.
Figure 2:
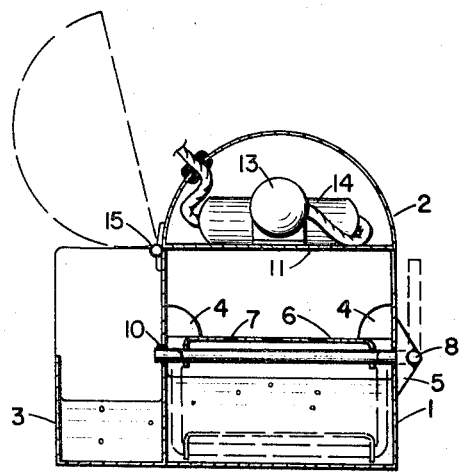
FIG. 2 is a section taken as indicated on FIG. 1.

Referring now to the drawing, wherein like parts are given the same numeral in all figures, the container comprises two main portions, a container 1 and a lid 2. Container 1 comprises a generally rectangular, liquid-tight box having a front, a back, ends, and a bottom, and is open at its top. Container 1 can be further provided with a supplemental chamber 3 having one wall in common with container 1, and also being liquid-tight and open at its top. Container 1 is further provided with a plurality of stops 4 and with a friction catch 5.

A tray 6, preferably having perforations 7, is adapted to fit loosely within container 1, and has one of its horizontal dimensions, preferably its length, substantially smaller than the corresponding inner dimension of container 1. An operating lever 8, which can for example comprise a formed wire or rod, passes through a hole 9 in the front wall of container 1 and can either pass through a similar hole 10 or into a socket (not shown) in the rear wall of container 1. Lever 8 is shaped, within the confines of container 1, into three sides of a rectangle, with short outwardly-turned portions at the open-side ends, and with a further extension from one of said outwardly-turned portions. The middle side of the rectangle shape of lever 8 is adapted to pass either under tray 6, or through holes in the downwardly-depending side flanges of tray 6 as shown.

Lid 2 is generally semi-cylindrical in shape, and has closed ends. Lid 2 is further provided with a support 11, which in turn is provided with a bulb socket 12, a bulb 13, and a switch 14. Socket 12 and switch 14 are suitably connected by wiring as to be capable of being connected to an electrical power source. Lid 2 is mounted on container 1 by a hinge or hinges 15. Switch 14 is adapted to break the circuit to socket 12 when lid 2 is raised from its closed position, and can for example comprise a contact-actuated switch adapted to close the circuit upon contact with container 1, or a tilt-actuating switch such as a mercury switch oriented perpendicular to the axis of hinge 15 and arranged to open the circuit upon opening of lid 2.

Figure 3:
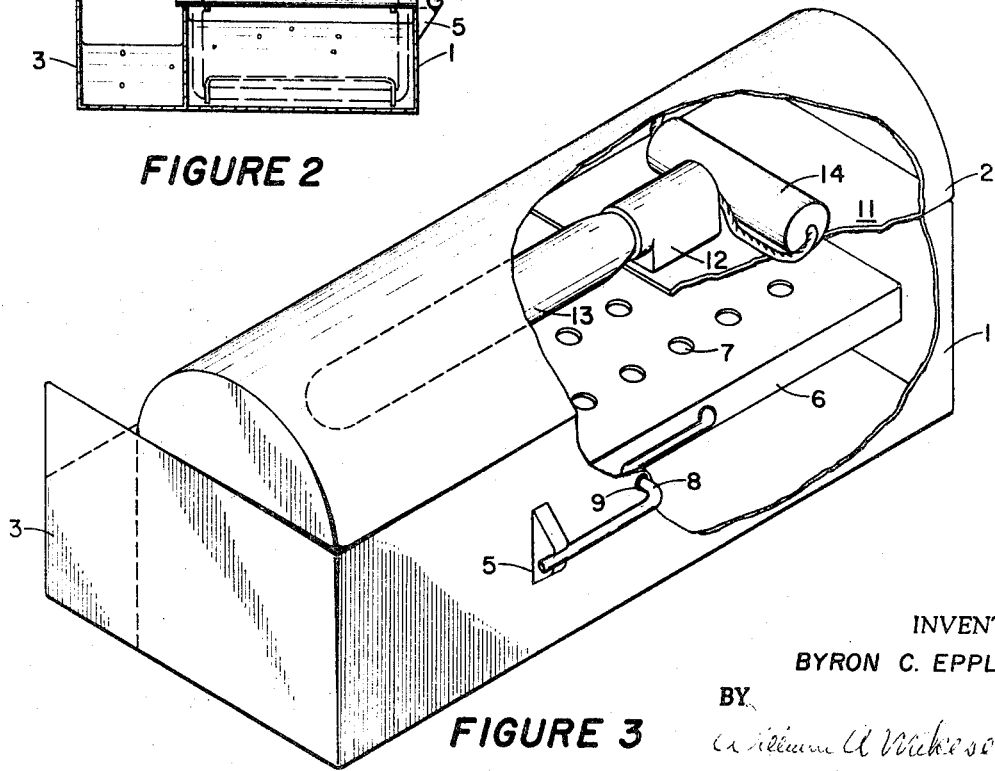
FIG. 3 is a pictorial view, partially cut away, of a container according to my invention.

In operation, a suitable sterilizing solution is poured into container 1 to a depth substantially above tray 6 in its lowered position, but below tray 6 in its raised position. Rotation of the external extension of lever 8 about its axis in a counterclockwise direction, as shown in FIG. 3, raises tray 6 above the liquid level, and lever 8 can be latched into catch 5 so as to maintain the tray in its raised position. Tray 6 is held level in its raised position by virtue of abutting against stops 4. Implements placed on tray 6 are thus held above the sterilizing solution for easy retrieval, and can be immersed in solution by unlatching lever 8 from catch 5 and allowing the lever to rotate. It can be seen that the slight end-wise movement of tray 6 during rotation of lever 8 requires that the tray be somewhat shorter than the inside length of container 1. Bulb 13 is preferably a sterilizing bulb, such as an ultra-violet bulb, but can be less preferably a heat bulb which serves to dry implements on tray 6 in its raised position. In either event, the inner surface of lid 2 above bulb 13 can, if desired, be silvered or otherwise made reflective to concentrate radiation downward. The concave shape of the interior of lid 2 has such effect, however, even in the absence of silvering. Bulb 13 is turned off by opening lid 2, and on by closing same. Lastly, supplemental chamber 3, which is liquid-tight from container 1, can contain, e.g., light machine oil, and serves for storage of electric clippers, which are stored therein with their cutting blade ends immersed.

The terms and expressions which have been used are terms of description and not of limitation, and there is no intention in the use of such terms and expressions of excluding any equivalents of the features shown and described, or portions thereof, but it is recognized that various modifications are possible within the scope of the invention claimed.

What is claimed is:
1. A receptacle for barber implements comprising:
(a) liquid-tight container means having a bottom, front wall, back wall, and end walls,
(b) lid means for covering the top of said container means,
(c) hinge means connecting said lid means with an upper edge of said back wall,
(d) generally rectangular tray means of a size to lie within and parallel to the bottom of said container,
(e) stop means protruding from the interior of said wall means,
(f) lever means pivotally mounted in said front and said back walls for moving said tray means from a first position adjacent said bottom to a second position substantially parallel to but spaced from said bottom and adjacent said stop means,
(g) catch means for holding said lever means in said second position, and
(h) wherein said lid means is further provided with illumination means therein, and with switch means for activating said illumination means upon approach of said lid means to said container means.
2. The receptacle of claim 1 wherein said lid means is of generally semicylindrical configuration, concave downwardly, and having closed ends.

3. The receptacle of claim 1 wherein said illumination means is a source of ultraviolet rays.

References Cited

UNITED STATES PATENTS

| | | | |
|---|---|---|---|
| 1,850,524 | 3/1932 | Whittaker | 21—87 |
| 2,231,790 | 2/1941 | Andress | 21—87 |
| 2,554,156 | 5/1951 | Rosenthal | 21—101UX |
| 2,786,245 | 3/1957 | Steinbock | 21—105 |
| 2,889,837 | 6/1959 | Braun | 21—101UX |
| 3,419,346 | 12/1968 | Nicholas | 21—105X |

FOREIGN PATENTS

| | | | |
|---|---|---|---|
| 13,653 | 8/1910 | Denmark | 21—99 |
| 277,801 | 9/1930 | Italy | 21—99 |
| 469,009 | 2/1952 | Italy | 21—101 |

JOSEPH SCOVRONEK, Primary Examiner

D. G. MILLMAN, Assistant Examiner

U.S. Cl. X.R.

21—90, 91, 102, 105; 312—209